(12) United States Patent
Henne et al.

(10) Patent No.: US 7,589,437 B2
(45) Date of Patent: Sep. 15, 2009

(54) CONTROL UNIT IN A VEHICLE

(75) Inventors: Ralf Henne, Sachsenheim (DE); Achim Henne, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/523,309

(22) PCT Filed: Feb. 20, 2003

(86) PCT No.: PCT/DE03/00525

§ 371 (c)(1), (2), (4) Date: Sep. 26, 2005

(87) PCT Pub. No.: WO2004/016472

PCT Pub. Date: Feb. 26, 2004

(65) Prior Publication Data

US 2006/0163946 A1 Jul. 27, 2006

(30) Foreign Application Priority Data

Aug. 1, 2002 (DE) .................... 102 35 162

(51) Int. Cl.
*B60L 3/00* (2006.01)
*H02J 7/00* (2006.01)
*H02J 1/00* (2006.01)

(52) U.S. Cl. ............ 307/100; 307/9.1; 307/10.1; 307/66; 307/82

(58) Field of Classification Search ............ 307/100, 307/82
See application file for complete search history.

(56) References Cited

U.S. PATENT DOCUMENTS

| | | | | |
|---|---|---|---|---|
| 4,667,283 A | * | 5/1987 | Seki et al. ............... 363/95 |
| 5,725,242 A | * | 3/1998 | Belau et al. ............... 280/735 |
| 5,844,469 A | * | 12/1998 | Regazzi et al. ........... 340/426.35 |
| 5,906,392 A | | 5/1999 | Reid et al. |
| 5,934,704 A | * | 8/1999 | Hansen et al. ............... 280/735 |
| 5,994,788 A | * | 11/1999 | Dobler et al. ............... 307/10.1 |
| 6,121,692 A | * | 9/2000 | Michaels et al. ............ 307/10.1 |
| 6,646,500 B2 | * | 11/2003 | Li et al. ..................... 329/318 |
| 6,650,030 B2 | * | 11/2003 | Has .......................... 307/140 |
| 7,061,139 B2 | * | 6/2006 | Young et al. ............... 307/45 |

FOREIGN PATENT DOCUMENTS

| | | |
|---|---|---|
| CN | 1061861 | 6/1992 |
| CN | 1200847 | 12/1998 |

(Continued)

OTHER PUBLICATIONS

Translation of German Patent DE 198 29 730 to Berberich, Reinhold et al., Jan. 20, 2000 (translation obtained Jun. 2007).*

*Primary Examiner*—Albert W Paladini
*Assistant Examiner*—Hal I Kaplan
(74) *Attorney, Agent, or Firm*—Kenyon & Kenyon LLP

(57) ABSTRACT

A control unit in a vehicle is provided in which power is supplied via a converter that provides an electrical isolation. For the data exchange with external components and other components in the control unit that are not electrically isolated, the component isolated by this electrical isolation is additionally connected to a coupling element that likewise provides an electrical isolation.

14 Claims, 3 Drawing Sheets

FOREIGN PATENT DOCUMENTS

| | | |
|---|---|---|
| CN | 1317873 | 10/2001 |
| CN | 1649756 | 8/2005 |
| DE | 32 28 623 | 3/1983 |
| DE | 198 14 589 | 10/1999 |
| DE | 198 29 730 | 1/2000 |
| DE | 101 03 280 | 8/2002 |
| EP | 1 084 910 | 3/2001 |
| JP | 2122272 | 5/1990 |
| JP | 5-030667 | 2/1993 |
| JP | 07165009 | 6/1995 |
| JP | 2001322527 | 11/2001 |

\* cited by examiner

CONTROL UNIT IN A VEHICLE

FIELD OF THE INVENTION

The present invention relates to a control unit in a vehicle.

BACKGROUND INFORMATION

Airbag control units in a motor vehicle can have the problem that a fault such as a short circuit of the minus output stage of an ignition circuit control to a vehicle ground or a short circuit of the plus output stage to the vehicle ground can lead to an unintentional triggering of restraint devices. It can also be a problem to rely on a critical low value of a resistance between a printed circuit board ground in the control unit and the vehicle ground to prevent unintentional triggering, especially in vehicles that have an aluminum chassis, which feature higher resistance values due to the type of construction. Moreover, in the case of this material, due to the significant oxide layer formation, it is difficult to guarantee, for the entire service life of the vehicle, a low-impedance connection.

SUMMARY OF THE INVENTION

An example control unit in a motor vehicle in accordance with the present invention may have the advantage that, due to the decoupling of relevant components in the control unit, e.g., an airbag control unit, from a vehicle electrical system, cases of a fault such as a short circuit of the minus output stage of the ignition circuit control to the vehicle ground or a short circuit of the plus output stage to the vehicle ground do not lead to an unintentional triggering of restraint devices. This is due to the fact that, in such a case of a fault in the control unit according to the present invention, no unintended current can flow via the firing element, i.e., a firing pellet for example.

It may also be advantageous that the resistance value between a printed circuit board ground in the control unit and the vehicle ground is not critical to prevent unintentional triggering, which may be especially important in vehicles that have an aluminum chassis, which feature higher resistance values due to the type of construction. Moreover, in the case of this material, due to the significant oxide layer formation, it is less important to guarantee, for the entire service life of the vehicle, a very low-impedance connection with the present invention.

Furthermore, due to an electrical isolation of ICs, which are supplied with an electrically isolated supply voltage, it is possible to retain the cost-effective 40 V manufacturing processes even at high electrical system voltages, in the case of a 42 V electrical system for instance. Hence, it is not necessary to switch to more expensive processes with higher voltages, since the vehicle electrical system has no relationship to internal supply voltages. Here, especially in the case of the ignition IC, i.e., the ignition circuit control, space may be saved in the case of the output stage transistors since these no longer need to be short circuit-proof vis-à-vis the high electrical system voltage. It is furthermore advantageous that, due to the electrical isolation, in the case of a fault of a short circuit of the plus output stage to the vehicle ground, the firing pellet can continue to be fired in the standard triggering case since the voltage at the plus output stage is no longer short-circuited.

It may be particularly advantageous if the electrical isolation in the converter used for supplying power to the control unit is achieved by a transformer, in particular, a DC/AC voltage converter on the primary side and a rectifier on the secondary side. Since the battery in the vehicle supplies a direct current, the DC/AC voltage converter is necessary to transmit the power via the transformer. A rectifier is provided on the secondary side because the components situated in the control unit on the secondary side require a DC voltage. The DC/AC voltage converter can take the form of an oscillator or a chopper.

In addition, it may be advantageous if the coupling element used for transmitting data from external peripheral components to the control unit electronics or to the ignition circuit control takes the form of an optocoupler, so that the electrical isolation in the transmission of data is ensured here as well.

Moreover, it may be advantageous if the converter is connected to at least one energy store, preferably a capacitor, which, in the event of a disconnection of the power supply, i.e., of the vehicle battery, continues to run the converter and does so for a specified time. This guarantees a short-term operation of the airbag control unit especially in an accident situation.

Either the entire control unit electronics, i.e., in particular the processor, or merely the ignition circuit control may be provided as the components in the control unit protected by the electrical isolation.

BRIEF DESCRIPTION OF THE DRAWINGS

Exemplary embodiments of the present invention are depicted in the figures and are explained in greater detail below.

DETAILED DESCRIPTION OF EXAMPLE EMBODIMENTS

Figure 1:
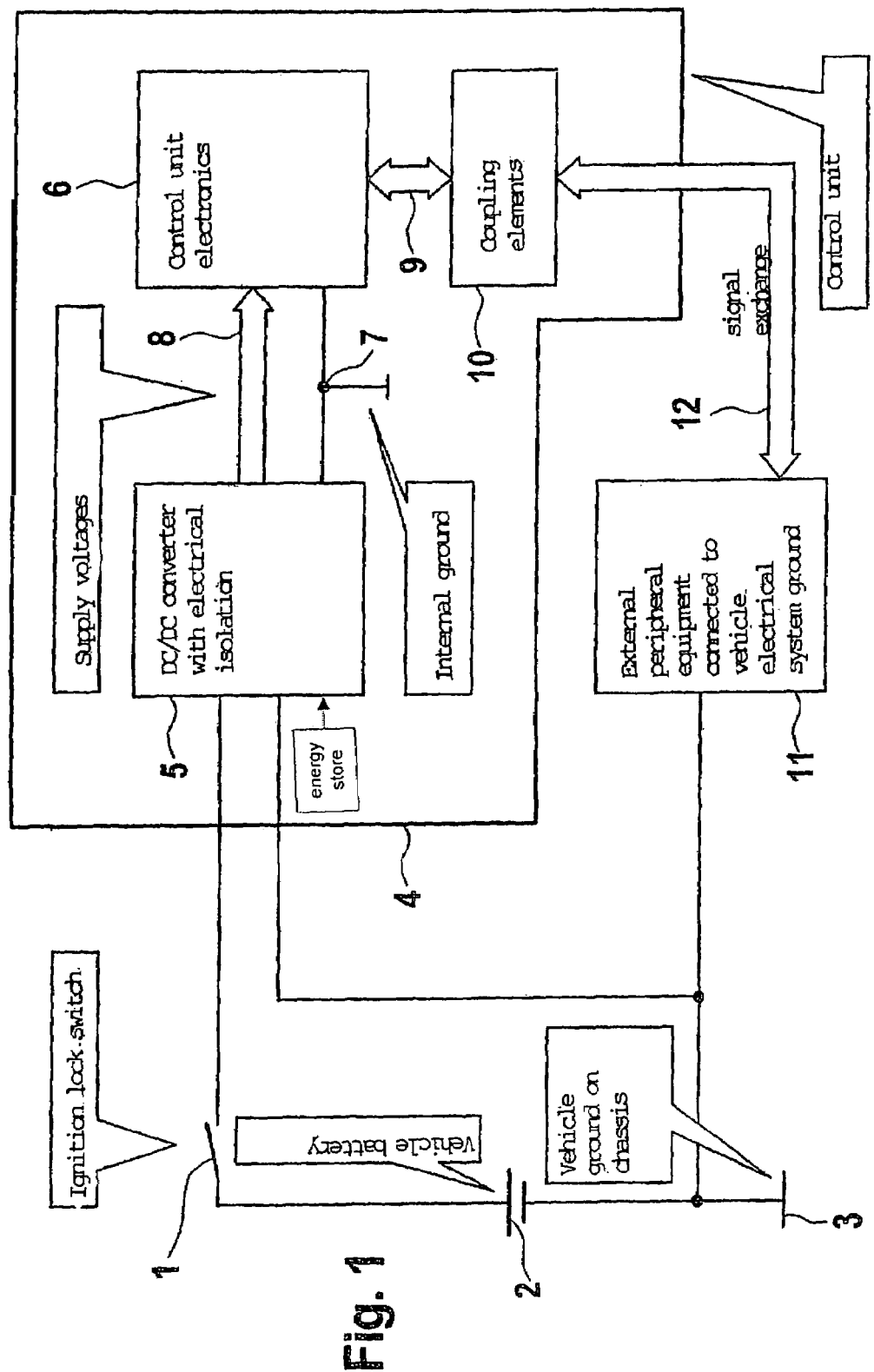
FIG. 1 shows a first exemplary embodiment of the present invention.

In conventional airbag control units, the ground connection to the control unit supply is established either via a separate ground line or via a conductive connection of the printed circuit board ground to the metal control unit housing which is conductively connected to the vehicle ground. In both methods, a connection of the lowest possible impedance is required to avoid different potentials of the printed circuit board ground relative to the vehicle ground. For this purpose, especially the resistance of the separate ground line or the contact resistance of the metal control unit housing to the vehicle ground must be taken into account.

If there is no case of a fault, i.e., if there is no short circuit of the minus output stage to the vehicle ground, no short circuit of the plus output stage to the vehicle ground or an interruption of the connection to the vehicle ground, this will result in the following switching-on operation:

When closing the ignition lock switch, the starting current of the airbag control unit is limited by the resistances of the supply line and pre-fuse of the series resistance on the printed circuit board for limiting the charging current and the resistance of the separate ground line or the contact resistance of the metal control unit housing to the vehicle ground. The charging current flows, typically at 220 to 470 µF, to an electrolytic capacitor, which is required for filtering the supply voltage. In addition, a diode is provided as a reverse-polarity protection diode. Depending on the battery voltage and the total resistance of the resistances just mentioned, the charging current is of a magnitude of a multiple of 10 A. This current flows through the contact resistance or the resistance of the separate ground line and there causes a voltage drop so that a voltage rise of the printed circuit board ground vis-à-vis the vehicle ground can occur. This voltage rise is normally not critical.

If there is a short circuit of the minus output stage of the ignition circuit control to the vehicle ground, however, then the printed circuit board ground will be raised positively as just described. Thus, due to the fault in the minus output stage, the firing pellet is directly connected to the vehicle ground. As a result, the vehicle ground has a more negative potential than the printed circuit board ground. If the potential difference is sufficiently high, parasitic diodes on the ignition circuit IC become conductive, and a current flows through the firing pellet. The duration of the current flow and the current level are possibly great enough to cause an unintended triggering.

If, however, there is a short circuit of the plus output stage to the vehicle ground, the firing pellet will be connected to the vehicle ground when it is connected to the plus output stage. For this reason as well, the vehicle ground has a more negative potential than the printed circuit board ground. If the potential difference is sufficiently high, the diodes on the IC for the ignition circuit control become conductive, and a current flows through the firing pellet. The duration of the current flow and the current level are possibly great enough to cause an unintended triggering.

Now if there is an interruption of the connection to the vehicle ground and a short circuit of the minus output stage to the vehicle ground or a short circuit of the plus output stage to the vehicle ground, then the following situation results:

The starting current is no longer able to flow through the connection to the vehicle ground, since the control unit has no ground connection. It flows in this case through the parasitic diodes on the ignition circuit IC. In addition, a current flows through the firing pellet. The duration of the current flow and the current level are in any event great enough to cause an unintended triggering. The control unit in this case obtains the ground connection via the firing pellet.

According to the present invention, a control unit is now proposed which in the case of these faults does not result in an unintentional triggering of the firing pellet. Particularly due to the electrical isolation, the current flow, which can result in an unintentional triggering of the firing pellet, is not possible.

The electrical isolation is necessary to isolate the control unit voltage supply from the vehicle electrical system. This is preferably achieved using a transformer in a DC voltage converter. To this end, a generation of AC voltage is required on the primary side and a rectifier on the secondary side. In addition, signals of the external peripheral equipment, e.g., a diagnostic line or a belt-buckle switch or sensors that relate to the ground of the vehicle electrical system, must be connected to the electrically isolated components in the control unit via so-called coupling elements. Optocouplers are preferably used as such coupling elements. These coupling elements can be designed as discrete elements or can also be integrated in an appropriate IC of the control unit.

FIG. 1 shows a first block diagram of an example device according to the present invention. An ignition lock switch 1 isolates a vehicle battery 2, which is connected on the other side to ground, namely to the vehicle ground, at chassis 3. On the other side, ignition lock switch 1 is connected to a converter 5 located in a control unit 4. Converter 5 is on the one side connected to vehicle ground 3 and on the other side to an internal ground 7. Converter 5 itself has an electrical isolation, so that vehicle ground 3 is isolated from internal ground 7 in terms of direct current. Converter 5 provides the supply voltages 8 to a control unit electronics 6. Control unit electronics 6 conducts a data exchange 9 with the coupling elements 10, which are likewise located in control unit 4. Coupling elements 10—which themselves also feature an electrical isolation, since optocouplers are preferably used here—are connected on the other side to external peripheral equipment 11 via a data input/output 12. External peripheral equipment 11 is in turn connected to vehicle ground 3. External peripheral equipment 11 means sensors and/or diagnostic lines and/or belt-buckle switches.

Figure 3:
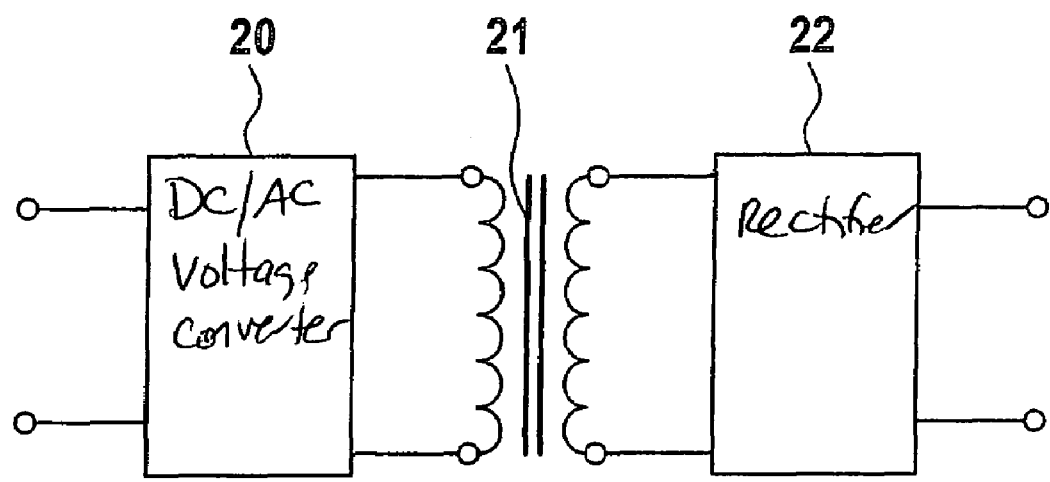
FIG. 3 shows a block diagram of the converter.

Converter 5 here is a DC voltage converter. This DC voltage converter now has a configuration as represented in FIG. 3. There a DC/AC voltage converter 20 is provided, which is connected to a transformer 21. A rectifier 22 is provided on the secondary side of transformer 21. DC/AC voltage converter 20 may take the form of an oscillator or, for example, also of a chopper. This is then used to generate an AC voltage that can be transmitted via transformer 21. Rectifier 22 then again rectifies the AC voltage, so that control unit electronics 6 can be supplied. Rectifier 22 can in particular take the form of a bridge rectifier, having diodes connected in the arms of the bridge. However, simpler or alternative rectifier circuits are also possible.

Figure 2:
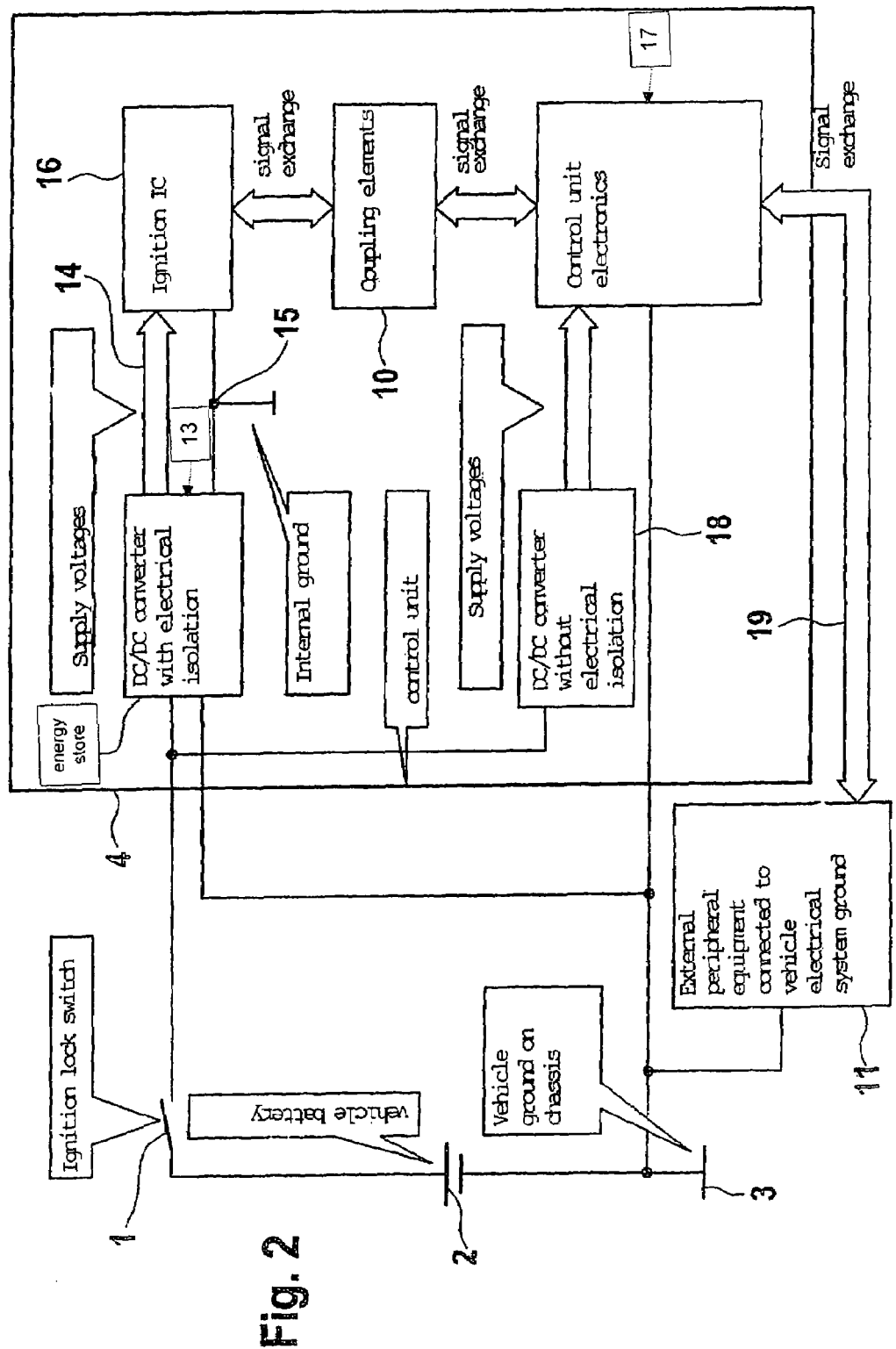
FIG. 2 shows a second exemplary embodiment of the present invention.

FIG. 2 shows a second embodiment of the present invention. Identical components as in FIG. 1 are indicated by the same reference numerals. Again, an ignition lock switch 1 is connected to a vehicle battery 2, which in turn is connected to a vehicle ground 3. On the other side, ignition lock switch 1 is connected to the control unit 4 and thereby to a converter 13 having an electrical isolation and a converter 18 having no electrical isolation. Converter 13 is designed as shown in FIG. 3. On the other side, converter 13 is connected to the internal ground 15 of control unit 4 and provides the supply voltages to an ignition circuit IC 16 via a line 14. Via a data input/output, ignition circuit IC 16 is connected to coupling elements 10, which carry out a signal exchange with the control unit electronics 17. Control unit electronics 17 receives the power supply from converter 18 without electrical isolation, and control unit electronics 17 is further connected to vehicle ground 3. In addition, the control unit electronics is connected via a line 19 to the external peripheral equipment 11, which itself in turn is related to vehicle ground 3.

This example shows that the electrical isolation according to the present invention with the aid of a converter can also be used merely to isolate individual components in the control unit that are critical with regard to safety, while leaving other components connected to the vehicle ground.

It is also possible to isolate other components or additional components which, in the case of a fault, can likewise lead to the fatal consequences presented at the beginning of the description. As shown above, however, the electrical isolation also has the advantage that it allows for a voltage conversion which makes it possible to continue to use existing manufacturing processes for the components of the control unit.

Using a power reserve capacitor as an energy store, converter 5 or 13 can continue to be operated for a defined self-sufficiency period even when the battery, i.e. the power supply, is disconnected.

What is claimed is:

1. An airbag control unit for a vehicle, comprising:
   an internal ground;
   an integrated circuit, wherein at least one component of the integrated circuit is connected to the internal ground;
   a converter having an electrical isolation from a main electrical system of the vehicle, wherein the converter is configured for supplying an electrically isolated supply voltage to the at least one component of the integrated circuit, and wherein the converter is connected to the internal ground to provide electrical isolation of the internal ground from the main electrical system of the vehicle; and at least one coupling element having an electrical isolation from the main electrical system, wherein the coupling element is configured to be connected to the integrated circuit and transmit data solely within the airbag control unit.

2. The control unit as recited in claim 1, wherein the converter includes a transformer for electrical isolation, a DC/AC voltage converter being provided on a primary side, and a rectifier being provided on a secondary side.

3. The control unit as recited in claim 2, wherein the DC/AC voltage converter includes an oscillator.

4. The control unit as recited in claim 2, wherein the DC/AC voltage converter includes a chopper.

5. The control unit as recited in claim 1, wherein the at least one coupling element is an optocoupler.

6. The control unit as recited in claim 1, wherein the converter is connected to at least one energy store which runs the converter in case a power supply is disconnected.

7. The control unit as recited in claim 1, wherein the integrated circuit is an ignition circuit control for a restraint device.

8. The control unit as recited in claim 1, wherein the integrated circuit includes electronics of the control unit.

9. The control unit of claim 1, further comprising:

a second converter having input terminals configured to receive a vehicle battery voltage, and output terminals configured to provide a second supply voltage;

an electronics component configured to receive the second supply voltage; and wherein the coupling element is configured to exchange data between the integrated circuit and the electronics component in a manner in which the integrated circuit remains electrically isolated from the electronics component.

10. A vehicle control system having the control unit of claim 1, wherein the converter is configured to receive a vehicle battery voltage in response to a closing of an ignition lock switch, and is configured to generate the supply voltage based on the vehicle battery voltage.

11. An airbag control unit, comprising:

an integrated circuit;

a first dc-to-dc converter having input terminals configured to receive a vehicle battery voltage and a vehicle ground, and output terminals configured to provide a first internal supply voltage and an internal ground to the integrated circuit, wherein the output terminals are electrically isolated from any vehicle components carrying the vehicle battery voltage and any components carrying the vehicle ground;

a second dc-to-dc converter having input terminals configured to receive the vehicle battery voltage, and output terminals configured to provide a second internal supply voltage;

an electronics component configured to receive the second internal supply voltage; and a coupling element configured to exchange data solely within the control unit, wherein the coupling element exchanges data between the integrated circuit and the electronics component in a manner in which the integrated circuit remains electrically isolated from the electronics component.

12. A vehicle control system having the control unit of claim 11, wherein the first dc-to-dc converter is configured to receive the vehicle battery voltage in response to a closing of an ignition lock switch, and to generate the first internal supply voltage based on the vehicle battery voltage.

13. A vehicle airbag control system, comprising:

an integrated circuit;

a dc-to-dc converter having input terminals configured to receive a vehicle battery voltage and a vehicle ground, and output terminals configured to provide a first internal supply voltage and an internal ground to the integrated circuit, wherein the output terminals are electrically isolated from any vehicle components carrying the vehicle battery voltage and any components carrying the vehicle ground, wherein the dc-to-dc converter is configured to receive the vehicle battery voltage in response to a closing of an ignition lock switch; and a coupling element configured to transmit data to the integrated circuit in a manner in which the integrated circuit remains electrically isolated from a component at another end of the data transmission, wherein the coupling element exchanges data solely within the airbag control system.

14. The vehicle airbag control system of claim 13, further comprising:

a second dc-to-dc converter having input terminals configured to receive the vehicle battery voltage, and output terminals configured to provide a second internal supply voltage;

an electronics component configured to receive the second internal supply voltage;

wherein the coupling element is configured to exchange data between the integrated circuit and the electronics component in a manner in which the integrated circuit remains electrically isolated from the electronics component.

* * * * *

UNITED STATES PATENT AND TRADEMARK OFFICE
CERTIFICATE OF CORRECTION

PATENT NO. : 7,589,437 B2  Page 1 of 1
APPLICATION NO. : 10/523309
DATED : September 15, 2009
INVENTOR(S) : Henne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this

Twenty-first Day of September, 2010

David J. Kappos
*Director of the United States Patent and Trademark Office*